US012786799B2

(12) United States Patent
Li et al.

(10) Patent No.: US 12,786,799 B2
(45) Date of Patent: Nov. 3, 2026

(54) INITIAL BANDWIDTH PART DETERMINING METHOD AND APPARATUS, AND RELATED DEVICE

(71) Applicant: VIVO MOBILE COMMUNICATION CO., LTD., Guangdong (CN)

(72) Inventors: Dongru Li, Guangdong (CN); Lihui Wang, Guangdong (CN); Kai Wu, Guangdong (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 314 days.

(21) Appl. No.: 18/406,643

(22) Filed: Jan. 8, 2024

(65) Prior Publication Data

US 2024/0163730 A1 May 16, 2024

Related U.S. Application Data

(63) Continuation of application No. PCT/CN2022/103620, filed on Jul. 4, 2022.

(30) Foreign Application Priority Data

Jul. 8, 2021 (CN) ......................... 202110772885.7

(51) Int. Cl.
*H04L 5/00* (2006.01)
*H04W 28/02* (2009.01)
*H04W 28/20* (2009.01)

(52) U.S. Cl.
CPC .................................. *H04W 28/20* (2013.01)

(58) Field of Classification Search
CPC ............. H04W 28/20; H04W 74/0833; H04W 28/0289; H04L 5/0098
See application file for complete search history.

(56) References Cited

U.S. PATENT DOCUMENTS

2020/0288502 A1 9/2020 Lee et al.
2021/0167934 A1 6/2021 Fan et al.
(Continued)

FOREIGN PATENT DOCUMENTS

CN 110475294 A 11/2019
CN 110830200 A 2/2020
(Continued)

OTHER PUBLICATIONS

3GPP TSG RAN WG1 Meeting#104-e, R1-2100900 Title:Discussion on complexity reduction of reduced cabability NR devices (Year: 2021).*

(Continued)

*Primary Examiner* — Christopher M Crutchfield
*Assistant Examiner* — Abusayeed M Haque
(74) *Attorney, Agent, or Firm* — Foley & Lardner LLP

(57) ABSTRACT

An initial bandwidth part determining method and apparatus and a related device, which belong to the field of communication technologies. The initial bandwidth part determining method in embodiments of this application includes: obtaining, by a terminal, first information; and determining, by the terminal, a target initial bandwidth part among a first initial bandwidth part and/or a second initial bandwidth part according to the first information, where the first initial bandwidth part is configured for the terminal by a network side device; and the first information includes at least one of the following: first configuration information, where the first configuration information is used for configuring the target initial bandwidth part applied by the terminal; and an applying rule for the target initial bandwidth part.

17 Claims, 4 Drawing Sheets

(56) References Cited

U.S. PATENT DOCUMENTS

| | | | | |
|---|---|---|---|---|
| 2021/0168810 | A1 | 6/2021 | Chen et al. | |
| 2021/0195579 | A1* | 6/2021 | Lei | H04L 5/0053 |
| 2021/0352569 | A1* | 11/2021 | Koskinen | H04W 12/06 |
| 2022/0117005 | A1 | 4/2022 | Yang | |
| 2024/0080825 | A1 | 3/2024 | Mu | |

FOREIGN PATENT DOCUMENTS

| | | | |
|---|---|---|---|
| CN | 111669804 | A | 9/2020 |
| CN | 112889334 | A | 6/2021 |
| EP | 3979750 | A1 | 4/2022 |
| WO | 2020166891 | A1 | 8/2020 |
| WO | 2021015927 | A1 | 1/2021 |
| WO | 2021017016 | A1 | 2/2021 |

OTHER PUBLICATIONS

GPP TSG RAN WG1 Meeting#104b-e, R1-2103534 Title:Redeced maximum UE bandwidth for Redcap (Year: 2021).*

European Search Report for Application No. 22836851.0, Mailed Nov. 12, 2024, 9 pages.

Chinese Office Action for Chinese Patent Application No. 202110772885.7 dated Apr. 30, 2025. 18 pages.

CMCC. Discussion on potential UE complexity reduction features. 3GPP TSG RAN WG1 #102-e. R1-2006217. Online. Aug. 2020. 7 pages.

CMCC. Discussion on UE complexity reduction features. 3GPP TSG RAN WG1 #103-e. R1-2008016. Online. Oct.-Nov. 2020. 10 pages.

International Search Report and Written Opinion for Application No. PCT /CN2022/103620, dated Aug. 25, 2022, 9 Pages.

LG Electronics "Discussion on complexity reduction of reduced capability NR devices" 3GPP TSG RAN WG1 Meeting #104-e, e-Meeting, Jan. 2021, R1-2100900, 8 Pages.

Lenovo, Motorola Mobility "Reduced maximum UE bandwidth for RedCap" 3GPP TSG RAN WG1 Meeting #104b-e, e-Meeting, Apr. 2021, R1-2103534, 4 Pages.

Lenovo, Motorola Mobility "Reduced maximum UE bandwidth for RedCap" 3GPP TSG RAN WG1 Meeting #104b-e, e-Meeting, Apr. 2021, R1-2103767, 4 Pages.

Qualcomm Incorporated "BW Reduction for RedCap Ue" 3GPP TSG-RAN WG1 Meeting #105, e-Meeting, May 2021, R1-2104677, 18 Pages.

Vivo, Guangdong Genius "Discussion on reduced maximum UE bandwidth" 3GPP TSG RAN WG1 #106-e, e-Meeting, Aug. 2021, R1-2106601, 9 Pages.

* cited by examiner

INITIAL BANDWIDTH PART DETERMINING METHOD AND APPARATUS, AND RELATED DEVICE

CROSS-REFERENCE TO RELATED APPLICATIONS

This application is a continuation of International Application No. PCT/CN2022/103620 filed on Jul. 4, 2022, which claims priority to Chinese Patent Application No. 202110772885.7 filed on Jul. 8, 2021, which are incorporated herein by reference in their entireties.

TECHNICAL FIELD

This application belongs to the field of communication technologies, and specifically, to an initial bandwidth part determining method and apparatus, and a related device.

BACKGROUND

Currently, a reduced capability (RedCap) terminal (for example, wearable devices such as a watch, a bracelet, and the like) refers to a type of terminal devices with limited capabilities in terms of a quantity of receiving antennas, an operating bandwidth, a maximum modulation order, and the like. With a current rising demand for the type of terminals, a quantity of the type of reduced capability terminal devices is huge. In addition, for objectives such as reducing terminal power consumption, a bandwidth part (BWP) is introduced in related communication protocols, where an initial BWP is mainly used for an initial access process.

In actual application, when there are a large quantity of terminal devices accessing a same cell, it is possible to cause a network side device to schedule a large quantity of terminals on the initial BWP or a large quantity of terminals to access a network on the initial BWP, causing problems such as scheduling or access congestion, and resulting in a decrease in system throughput and communication performance.

SUMMARY

Embodiments of this application provide an initial bandwidth part determining method and apparatus and a related device.

According to a first aspect, an initial bandwidth part determining method is provided, including:

obtaining, by a terminal, first information; and determining, by the terminal, a target initial bandwidth part among a first initial bandwidth part and/or a second initial bandwidth part according to the first information, where the first initial bandwidth part is configured for the terminal by a network side device; and the first information includes at least one of the following:

first configuration information, where the first configuration information is used for configuring the target initial bandwidth part applied by the terminal; and an applying rule for the target initial bandwidth part.

According to a second aspect, an initial bandwidth part determining method is provided, including:

sending, by a network side device, first information to a terminal, where the first information is used for indicating the terminal to determine a target initial bandwidth part in a first initial bandwidth part and/or a second initial bandwidth part, and the first initial bandwidth part is configured for the terminal by the network side device; and the first information includes at least one of the following:

first configuration information, where the first configuration information is used for configuring the target initial bandwidth part applied by the terminal; and an applying rule for the target initial bandwidth part.

According to a third aspect, an initial bandwidth part determining apparatus is provided, including:

an obtaining module, configured to obtain first information; and a determining module, configured to determine a target initial bandwidth part among a first initial bandwidth part and/or a second initial bandwidth part according to the first information, where the first initial bandwidth part is configured for the apparatus by a network side device; and the first information includes at least one of the following:

first configuration information, where the first configuration information is used for configuring the target initial bandwidth part applied by the apparatus; and an applying rule for the target initial bandwidth part.

According to a fourth aspect, an initial bandwidth part determining apparatus is provided, including:

a sending module, configured to send first information to a terminal, where the first information is used for indicating the terminal to determine a target initial bandwidth part in a first initial bandwidth part and/or a second initial bandwidth part, and the first initial bandwidth part is configured for the terminal by the apparatus; and the first information includes at least one of the following:

first configuration information, where the first configuration information is used for configuring the target initial bandwidth part applied by the terminal; and an applying rule for the target initial bandwidth part.

According to a fifth aspect, a terminal is provided, including a processor, a memory, and a program or an instruction stored in the memory and executable on the processor, where the program or instruction, when executed by the processor, implements the steps of the initial bandwidth part determining method according to the first aspect.

According to a sixth aspect, a terminal is provided, including a processor and a communication interface. The communication interface is configured to obtain first information. The processor is configured to determine a target initial bandwidth part among a first initial bandwidth part and/or a second initial bandwidth part according to the first information, where the first initial bandwidth part is configured for the terminal by a network side device; and the first information includes at least one of the following:

first configuration information, where the first configuration information is used for configuring the target initial bandwidth part applied by the terminal; and an applying rule for the target initial bandwidth part.

According to a seventh aspect, a network side device is provided, where the network side device includes a processor, a memory, and a program or an instruction that is stored in the memory and capable of running on the processor, where the program or instruction is executed by the processor to implement the steps of the initial bandwidth part determining method according to the second aspect.

According to an eighth aspect, a network side device is provided, including a processor and a communication interface. The communication interface is configured to send first information to a terminal, where the first information is used for indicating the terminal to determine a target initial bandwidth part in a first initial bandwidth part and/or a second initial bandwidth part, and the first initial bandwidth part is configured for the terminal by the network side device; and the first information includes at least one of the following:

first configuration information, where the first configuration information is used for configuring the target initial bandwidth part applied by the terminal; and an applying rule for the target initial bandwidth part.

According to a ninth aspect, a readable storage medium is provided, storing a program or an instruction, where the program or instruction, when executed by a processor, implements the steps of the initial bandwidth part determining method according to the first aspect, or implements the steps of the initial bandwidth part determining method according to the second aspect.

According to a tenth aspect, a chip is provided, including a processor and a communication interface, where the communication interface is coupled to the processor, and the processor is configured to run a program or an instruction, to implement the initial bandwidth part determining method according to the first aspect, or implement the initial bandwidth part determining method according to the second aspect.

According to an eleventh aspect, a computer program/program product is provided, being stored in a non-volatile storage medium, where the program/program product, when executed by at least one processor, implements the steps of the initial bandwidth part determining method according to the first aspect, or implements the steps of the initial bandwidth part determining method according to the second aspect.

In embodiments of this application, the terminal determines the target initial bandwidth part in the first initial bandwidth part and/or the second initial bandwidth part according to the obtained first information. In this way, each terminal may determine its own target initial bandwidth part based on the first information, thereby avoiding network congestion caused by a large quantity of terminals applying the same initial bandwidth part, and ensuring communication performance.

DETAILED DESCRIPTION

The technical solutions in embodiments of this application are clearly described below with reference to the accompanying drawings in embodiments of this application. Apparently, the described embodiments are merely some rather than all of embodiments of this application. All other embodiments obtained by a person of ordinary skill in the art based on embodiments of this application shall fall within the protection scope of this application.

In the specification and claims of this application, terms "first" and "second" are used to distinguish similar objects, but are not used to describe a specific sequence or order. It may be understood that the terms used in such a way is interchangeable in proper circumstances, so that embodiments of this application can be implemented in other sequences than the sequence illustrated or described herein. In addition, objects distinguished by "first" and "second" are usually of Type, and the number of objects is not limited. For example, a first object may be one or more than one. In addition, in the specification and claims, "and/or" means at least one of the connected objects, and the character "/" generally indicates an "or" relation between associated objects.

It should be noted that, the technology described in embodiments of this application is not limited to a long term evolution (LTE)/LTE evolution (LTE-A) system, but may further be used in other wireless communication systems, such as code division multiple access (CDMA), time division multiple access (TDMA), frequency division multiple access (FDMA), orthogonal frequency division multiple access, (OFDMA), single-carrier frequency-division multiple access (SC-FDMA), and other systems. The terms "system" and "network" in embodiments of this application are often used interchangeably, and the described technologies may be used both for the systems and radio technologies mentioned above and may also be used for other systems and radio technologies. The following descriptions describe a new radio (NR) system for the objective of being used as an example, and NR terms are used in most of the descriptions below. However, these technologies may also be applied to applications other than NR system applications, such as a $6^{th}$ generation (6G) communication system.

Figure 1:
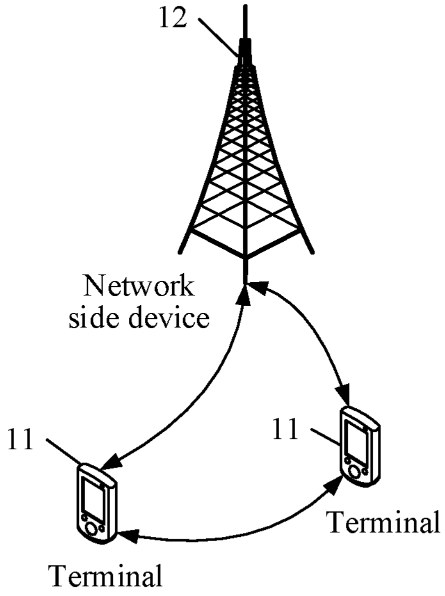
FIG. 1 is a block diagram of a wireless communication system to which an embodiment of this application may be applied.

FIG. 1 is a block diagram of a wireless communication system to which an embodiment of this application may be applied. The wireless communication system includes a terminal 11 and a network side device 12. The terminal 11 may also be referred to as a terminal device or user equipment (UE). The terminal 11 may be a terminal-side device such as a mobile phone, a tablet personal computer, a laptop computer, or referred to as a notebook computer, a personal digital assistant (PDA), a palmtop computer, a netbook, an ultra-mobile personal computer (UMPC), a mobile Internet device (MID), a wearable device, or vehicle user equipment (VUE), and pedestrian user equipment (PUE). The wearable device includes: a smart watch, a bracelet, headphones, glasses, or the like. It is to be noted that, in embodiments of this application, a specific type of the terminal 11 is not limited. The network side device 12 may be a base station or a core network, where the base station may be referred to as a NodeB, an evolved NodeB, an access point, a base transceiver station (BTS), a radio base station, a radio transceiver, a basic service set (BSS), an extended service set (ESS), a NodeB, an evolved NodeB (eNB), a household NodeB, a household evolved NodeB, a wireless local area network (WLAN) access point, a wireless fidelity (WiFi) node, a transmitting receiving point (TRP) or some other proper terms in the field. Provided that the same technical effect is achieved, the base station is not limited to a specific technical vocabulary. It is to be noted that, in embodiments of this application, only a base station in the NR system is used as an example, but a specific type of the base station is not limited.

An initial bandwidth part determining method provided in embodiments of this application is described in detail below by using some embodiments and application scenarios with reference to the accompanying drawings.

Figure 2:
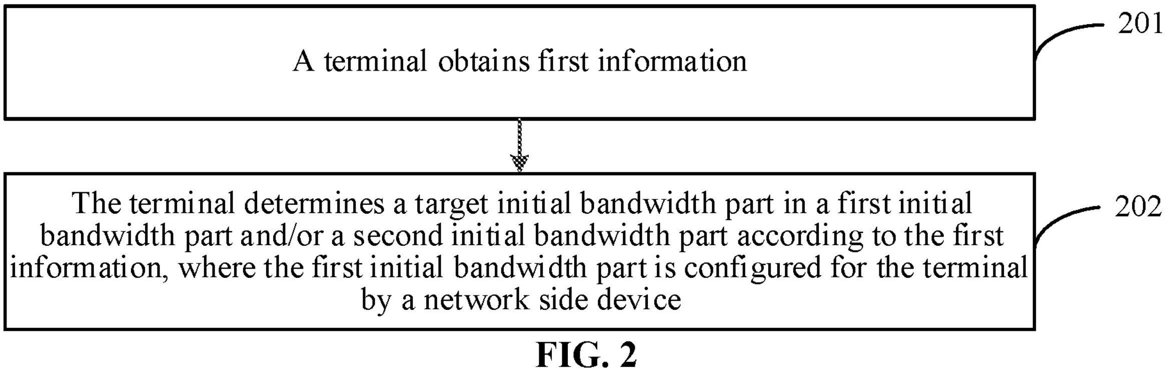
FIG. 2 is a flowchart of an initial bandwidth part determining method according to an embodiment of this application.

FIG. 2 is a flowchart of an initial bandwidth part determining method according to an embodiment of this application. The method is applied to a terminal. As shown in FIG. 2, the method includes the following steps:

Step 201: A terminal obtains first information.

the first information includes at least one of the following:

first configuration information, where the first configuration information is used for configuring the target initial bandwidth part applied by the terminal; and an applying rule for the target initial bandwidth part.

In some embodiments, the terminal obtains the first information through protocol specification and/or sending by a network side device. For example, when the first information includes the first configuration information, the network side device sends the first configuration information through a system information block (SIB), and the terminal obtains the first configuration information; when the first information includes the applying rule for the target initial bandwidth part, a protocol stipulates the applying rule for the target initial bandwidth part, and the terminal obtains the applying rule for the target initial bandwidth part according to the stipulation; and the first information may further include first configuration information and the applying rule for the target initial bandwidth part.

Step 202: Determine, by the terminal, a target initial bandwidth part among a first initial bandwidth part and/or a second initial bandwidth part according to the first information, where the first initial bandwidth part is configured for the terminal by a network side device.

It should be noted that the second initial bandwidth part may be configured for the terminal and/or a non-terminal by the network side device. Being configured for the terminal and/or the non-terminal means being used for the terminal and/or the non-terminal. The non-terminal refer to another terminal other than the terminal.

Optionally, there may be at least one first initial bandwidth part. For example, if the network side device configures the terminal with two first initial bandwidth parts, the terminal may determine a to-be-applied target initial bandwidth part from the two first initial bandwidth parts based on the first information. For another example, the network side device may configure the terminal with only one first initial bandwidth part. The terminal may determine the target initial bandwidth part in the first initial bandwidth part and the second initial bandwidth part based on the first information.

In embodiments of this application, the terminal determines the target initial bandwidth part in the first initial bandwidth part and/or the second initial bandwidth part according to the obtained first information. In this way, each terminal may determine its own target initial bandwidth part based on the first information, thereby avoiding network congestion caused by a large quantity of terminals applying the same initial bandwidth part, providing flexibility for network scheduling and initial access of the terminal, and ensuring communication performance.

In embodiments of this application, the terminal may be a specific terminal or a non-specific terminal; and the specific terminal may refer to a terminal with a specific capability or a terminal of a specific type. In some embodiments, the terminal refers to a reduced capability (RedCap) terminal, for example, devices such as a watch, a bracelet, and the like. In another embodiment, the terminal may be a non-RedCap terminal, for example, devices such as a mobile phone, and the like.

For a better understanding, refer to differences between a reduced capability terminal and a non-reduced capability terminal as listed in Table 1 below.

TABLE 1

A comparison table of a terminal capability between the non-RedCap terminal and the RedCap terminal

| Terminal capability item | non-RedCap terminal | RedCap terminal |
|---|---|---|
| Quantity of receiving antennas | 2 Rx or 4 Rx | Minimum 1 Rx, capable of supporting 2 Rx |
| Maximum bandwidth capability | FR1: 100 MHz; and FR2: 200 MHz | FR1: 20 MHz (at most supporting 20M); and FR2: 100 MHz |
| FDD duplex capability | Need (mandatory) full duplex | Support half duplex |
| Maximum modulation order | Need to (mandatory) support 256 QAM | Need to support 64 QAM Optionally support 256 QAM |

It may be learned from Table 1, there are major differences in terminal capabilities such as a quantity of receiving antennas and a maximum bandwidth capability between the reduced capability terminal and the non-reduced capability terminal. Terminals with different terminal capabilities may use different initial bandwidth parts. In this way, a congestion problem caused by all terminals applying the same initial BWP may be avoided.

In embodiments of this application, the terminal may refer to the reduced capability terminal, or may also refer to the non-reduced capability terminal. For example, the terminal is the reduced capability terminal, and the first initial bandwidth part is the initial bandwidth part configured for the reduced capability terminal by the network side device. The second initial bandwidth part is the initial bandwidth part configured for the non-reduced capability terminal (namely, a normal terminal or a legacy terminal) by the network side device; and for another example, the first initial bandwidth part may be the initial bandwidth part configured for the non-reduced capability terminal by the network side device. The second initial bandwidth part is the initial bandwidth part configured for the reduced capability terminal by the network side device.

Optionally, an example in which the terminal is the reduced capability terminal and the first initial bandwidth part is a network side device additionally configured for the reduced capability terminal is used. Then the reduced capability terminal determines the target initial bandwidth part in the first initial bandwidth part and/or the second initial bandwidth part based on the first information. In other words, when the network side device additionally configures the reduced capability terminal with the first initial bandwidth part, the reduced capability terminal may not necessarily use the first initial bandwidth part as the target initial bandwidth part. For example, if the second initial bandwidth part configured for the non-reduced capability terminal is less than or equal to a preset value, the reduced capability terminal may also determine the second initial bandwidth part as the target initial bandwidth part.

It may be understood that as listed in Table 1, a maximum bandwidth capability of the reduced capability terminal is different from a maximum bandwidth capability of the non-reduced capability terminal in the same frequency band. For example, in a frequency range 1 (FR1), the maximum bandwidth capability of the reduced capability terminal is 20 MHz, and the maximum bandwidth capability of the non-reduced capability terminal is 100 MHz; and under FR2, a maximum bandwidth capability of the reduced capability terminal is 100 MHz, and a maximum bandwidth capability of the non-reduced capability terminal is 200 MHz.

In some embodiments, if a bandwidth of the second initial bandwidth part is less than or equal to 20 MHz, the reduced capability terminal may also apply the second initial bandwidth part. In this case, the network side device may also additionally configure the reduced capability terminal with one first initial bandwidth part, and the network side device configures the target initial bandwidth part applied by the reduced capability terminal as the second initial bandwidth part through the first configuration information. The first configuration information may be carried in a system message (SIB), such as SIB1. Optionally, if the network determines that a quantity of terminals currently applying the second initial bandwidth part is greater than a preset quantity, the network side device may change an indication by sending the system message, and notify the terminal to receive a changed system message and indicate (or configure) the terminal to apply the additionally configured first initial bandwidth part in the changed system message. In other words, the terminal is indicated to determine the first initial bandwidth part as the target initial bandwidth part. In this way, the target initial bandwidth part applied by the terminal that subsequently joins a network becomes the first initial bandwidth part. Therefore, a problem of network congestion caused by a large quantity of terminals applying the second initial bandwidth part to reside or access may be avoided, to improve throughput and communication performance.

Optionally, the step 202 may include:

determining, by the terminal, the target initial bandwidth part in the first initial bandwidth part according to the first information when a bandwidth of the second initial bandwidth part is greater than a preset value.

For example, if the bandwidth of the second initial bandwidth part is greater than 20 MHz, to be specific, the reduced capability terminal cannot apply the second initial bandwidth part in this case, the reduced capability terminal may only determine the target initial bandwidth part in the first initial bandwidth part according to the first information. In this case, a quantity of first initial bandwidth parts configured for the reduced capability terminal by the network side device may be greater than one, and the reduced capability terminal determines the target initial bandwidth part from a plurality of first initial bandwidth parts according to the first information. For example, the first information may be an applying rule including the target initial bandwidth part, and the reduced capability terminal may determine the target initial bandwidth part from a plurality of first initial bandwidth parts based on a terminal capability of the reduced capability terminal. For example, the target initial bandwidth part is determined according to a quantity of receiving antennas of the reduced capability terminal. Certainly, the first information may be further in other possible forms. Correspondingly, the reduced capability terminal may further determine the target initial bandwidth part in other manners. This is described below through specific implementations.

Optionally, when the first information includes the applying rule for the target initial bandwidth part, the determining, by terminal, the target initial bandwidth part in the first initial bandwidth part and/or the second initial bandwidth part according to the applying rule for the target initial bandwidth part includes at least one of the following:

determining, by the terminal, the target initial bandwidth part based on a terminal capability of the terminal, where determined target initial bandwidth parts are different when different terminal capability is; and determining, by the terminal, the target initial bandwidth part based on a terminal identifier of the terminal.

The terminal capability may refer to characteristics of the terminal, such as a maximum quantity of receiving antennas of the terminal, a frequency division duplexing mode supported by the terminal, and the like. Optionally, the terminal capability includes at least one of the following:

a quantity of receiving antennas;

a supported frequency division duplexing mode, where the duplex mode includes any one of a full duplex mode, a mixed duplex mode, and a half duplex mode;

whether a measured first measurement value is equal to or greater than a first threshold;

whether a paging early indication (PEI) is supported; and whether a small data transmission (SDT) function in a radio resource control (RRC) idle mode or an inactive mode is supported.

In some embodiments, the terminal is the reduced capability terminal, and the first initial bandwidth part is the initial bandwidth part configured for the reduced capability terminal by the network side device. The second initial bandwidth part is the initial bandwidth part configured for the non-reduced capability terminal by the network side device; the bandwidth of the second initial bandwidth part is greater than 20 MHz, to be specific, the reduced capability terminal cannot apply the second initial bandwidth part in this case; and based on this condition, the following embodiments are used to specifically describe how to determine the target initial bandwidth part based on different terminal capabilities.

Based on the foregoing condition settings, in some embodiments, a quantity of first initial bandwidth parts configured by the network side device is two, such as an initial BWP 1 and an initial BWP 2; and the first information includes the applying rule for the target initial bandwidth part, and the applying rule includes: determining, by the terminal, the target initial bandwidth part based on a quantity of receiving antennas of the terminal. For example, the applying rule for the target initial bandwidth part specified in the protocol is: A reduced capability terminal with one receiving antenna determines the initial BWP 1 as the target initial bandwidth part, and a reduced capability terminal with two receiving antennas determines the initial BWP 2 as the target initial bandwidth part.

Based on the foregoing condition settings, in some embodiments, the first information includes the applying rule for the target initial bandwidth part, and the applying rule includes: determining, by the reduced capability terminal, the target initial bandwidth part according to a frequency division duplexing mode supported by the reduced capability terminal; a quantity of first initial bandwidths configured by the network side device is three, such as an initial BWP 1, an initial BWP 2, and an initial BWP 3; and specifically, the applying rule for the target initial bandwidth part is specified in a manner of network configuration is: A reduced capability terminal that supports a full duplex (FD) manner determines the initial BWP 1 as the target initial bandwidth part, a reduced capability terminal that supports a half duplex (HD) mode determines the initial BWP 2 as the target initial bandwidth part, and a reduced capability terminal that supports a mixed duplex mode determines the initial BWP 3 as the target initial bandwidth part.

Based on the foregoing condition settings, in some embodiments, the reduced capability terminal determines the target initial bandwidth part according to whether a measured first measurement value is equal to or greater than a first threshold; and the first measurement value includes but is not limited to measurement values such as a reference signal received power (RSRP), a reference signal received quality (RSRQ), and a signal-to-noise and interference ratio (SINR). For example, for a reduced capability terminal whose first measurement value is equal to or greater than the first threshold, the initial BWP 1 may be determined as the target initial bandwidth part. For a reduced capability terminal whose first measurement value is less than the first threshold, the initial BWP 2 may be determined as the target initial bandwidth part.

Based on the foregoing condition settings, in some embodiments, the reduced capability terminal determines the target initial bandwidth part according to whether PEI is supported. For example, a reduced capability terminal that supports PEI determines the initial BWP 1 as the target initial bandwidth part, and a reduced capability terminal that does not support PEI determines the initial BWP 2 as the target initial bandwidth part.

Based on the foregoing condition settings, in some embodiments, the reduced capability terminal determines the target initial bandwidth part according to whether the SDT function in the RRC idle mode or the inactive mode is supported. For example, the reduced capability terminal that supports the SDT function in the RRC idle mode or the inactive mode determines the initial BWP 1 as the target initial bandwidth part, and the reduced capability terminal that does not support the SDT function in the RRC idle mode or the inactive mode determines the initial BWP 2 as the target initial bandwidth part.

In embodiments of this application, when the first information includes the applying rule for the target initial bandwidth part, the terminal may determine the target initial bandwidth part based on a terminal capability of the terminal, thereby enabling a terminal with different terminal capabilities to apply different target initial bandwidth parts. In other words, different terminals may be diverted to different initial bandwidth parts from a perspective of the terminal capability, thus avoiding network congestion caused by a large quantity of terminals applying the same initial bandwidth part, and ensuring communication performance. In addition, when the first information includes the applying rule for the target initial bandwidth part, the terminal may further determine the target initial bandwidth part based on a terminal identifier of the terminal.

Optionally, the determining, by the terminal, the target initial bandwidth part based on a terminal identifier of the terminal includes:

performing, by the terminal, a modulo N operation based on the terminal identifier of the terminal, to obtain a remainder value, and determining the target initial bandwidth part according to the remainder value, where N is a total quantity of initial bandwidth parts that the terminal is capable of applying.

For example, a quantity of initial bandwidth parts configured for the network side device is three, which are an initial BWP 1, an initial BWP 2, and an initial BWP 3 respectively. In other words, a total quantity N of initial bandwidth parts that the terminal may apply is three. It is assumed that the terminal identifier is 4, the terminal performs a modulo N operation on the terminal identifier of the terminal to obtain a remainder value of 1, and then the terminal determines the initial BWP 1 as the target initial bandwidth part.

It may be understood that different terminals correspond to different terminal identifiers. In this way, different terminals may be diverted to different initial bandwidth parts by performing a modulo N operation on the terminal identifier, to avoid network congestion caused by a large quantity of terminals applying the same initial bandwidth part, and ensure communication performance.

In embodiments of this application, when the first information includes the applying rule for the target initial bandwidth part, the terminal may determine the target initial bandwidth part based on the terminal capability of the terminal and by performing a modulo N operation on the terminal identifier. For example, it is assumed that both the first terminal and the second terminal are reduced capability terminals with one receiving antenna, the terminal identifier corresponding to the first terminal is 4, and the terminal identifier corresponding to the second terminal is 5. The target initial bandwidth part is determined by performing a modulo N operation on the terminal identifier. The target initial bandwidth parts finally determined by the first terminal and the second terminal are also different. In this way, network congestion caused by a large quantity of terminals applying the same initial bandwidth may be more effectively avoided, thereby further ensuring communication performance. Certainly, the terminal capability may be further in other possible forms listed in the foregoing embodiments. This is not described herein again.

In embodiments of this application, the step 202 may further include:

determining, by the terminal according to the first information, the target initial bandwidth part applied to a specific case in the first initial bandwidth part and/or the second initial bandwidth part, where the specific case includes at least one of the following: the terminal performs initial access;

after an RRC connection is released, the terminal is in an RRC inactive mode or an idle mode;

a bandwidth part inactivity timer (bwp-inactivitytimer) expires, and the terminal is not configured with a default bandwidth part;

the bandwidth part inactivity timer expires (bwp-inactivitytimer), and the default bandwidth part configured by the terminal is an initial bandwidth part; and the terminal needs to initiate random access, and there is no random access channel occasion RO (RO) on an active bandwidth part.

The first information may include first configuration information. The first configuration information is used for configuring the target initial bandwidth part applied by the terminal in the foregoing specific case. The terminal may determine the target initial bandwidth part applied to the specific case based on the first configuration information; or the first information may be an applying rule including the first configuration information and the target initial bandwidth part. The terminal may determine the target initial bandwidth part applied to the specific case based on the first configuration information and the applying rule for the target initial bandwidth part, and the like.

For a better understanding, an example in which the terminal is the reduced capability terminal, the first initial bandwidth part is the initial bandwidth part configured for the reduced capability terminal by the network side device, and the second initial bandwidth part is the initial bandwidth part configured for the non-reduced capability terminal by the network side device is used, application of the target initial bandwidth part in the foregoing specific cases is described.

In some implementations, the specific case is that the terminal performs an initial access process; and if a bandwidth of the second initial bandwidth part is less than or equal to a preset value, for example, less than or equal to 20 MHz, the first information may include the first configuration information. The first configuration information may be used for configuring the target initial bandwidth part applied by the reduced capability terminal when performing initial access to be the second initial bandwidth part.

Alternatively, if a bandwidth of the second initial bandwidth part is greater than a preset value, the reduced capability terminal may also determine the target initial bandwidth part applied by the reduced capability terminal according to the first configuration information and the applying rule for the target initial bandwidth part. For example, a quantity of first initial bandwidth parts configured by the network side device is two, such as an initial BWP 1 and an initial BWP 2; and based on the applying rule for the first configuration information and the target initial bandwidth part, for example, according to a quantity of receiving antennas that the reduced capability terminal has, a reduced capability terminal with one receiving antenna determines the initial BWP 1 as the target initial bandwidth part, and a reduced capability terminal with two receiving antennas determines the initial BWP 2 as the target initial bandwidth part.

In some other implementations, the specific case may mean that after the RRC connection is released, the network side device may configure the target initial bandwidth part applied by the terminal in this case through the first configuration information. For example, if the bandwidth of the second initial bandwidth part is greater than the preset value, the first configuration information is used for configuring the target initial bandwidth part applied in the foregoing case by a reduced capability terminal with one receiving antenna as the initial BWP 1, and the target initial bandwidth part applied in the foregoing case by a reduced capability terminal with two receiving antennas as the initial BWP 2. Therefore, the reduced capability terminal determines the target initial bandwidth part applied in the foregoing case based on the first configuration information and the quantity of receiving antennas that the reduced capability terminal has.

Alternatively, if the bandwidth of the second initial bandwidth part is less than or equal to the preset value, the first configuration information may be used for indicating that the target initial bandwidth part applied by the reduced capability terminal (regardless of the quantity of receiving antennas of the reduced capability terminal) in the foregoing case is the second initial bandwidth part.

It should be noted that if the reduced capability terminal receives a clear indication (for example, configured through the first configuration information) to the target initial bandwidth part applied by the network side device after the RRC connection is released, the reduced capability terminal determines the target initial bandwidth part according to the indication. If there is no clear indication from the network side device, the reduced capability terminal may determine a default initial bandwidth part in the specific case according to the network configuration or protocol specification.

In some other implementations, the specific case may mean that the terminal is in an RRC inactive mode or an idle mode, and the network side device may configure the target initial bandwidth part applied by the terminal in this case through the first configuration information. For example, the first configuration information may be configuring the target initial bandwidth part applied by the reduced capability terminal with one receiving antenna as the initial BWP 1, and the target initial bandwidth part applied by the reduced capability terminal with two receiving antennas as the initial BWP 2.

In some other implementations, the specific case may mean that the bwp-inactivitytimer expires, and the terminal is not configured with a default bandwidth part. The default bandwidth part may also be referred to as a default bandwidth part. The first configuration information may be configuring the target initial bandwidth part applied by the reduced capability terminal with one receiving antenna as the initial BWP 1, and the target initial bandwidth part applied by the reduced capability terminal with two receiving antennas as the initial BWP 2; and therefore, when the bwp-inactivitytimer expires, and the reduced capability terminal is not configured with the default bandwidth part, the reduced capability terminal determines the target initial bandwidth part that is applied based on the first configuration information and a quantity of receiving antennas the reduced capability terminal has.

In some other implementations, the specific case may mean that the bwp-inactivity timer expires, and the default bandwidth part configured by the terminal is the initial bandwidth part. For example, the applying rule for the target initial bandwidth part may be configuring the target initial bandwidth part applied by the reduced capability terminal with one receiving antenna as the initial BWP 1, and the target initial bandwidth part applied by the reduced capability terminal with two receiving antennas as the initial BWP 2. Therefore, the reduced capability terminal determines the target initial bandwidth part applied in the foregoing case according to the applying rule for the target initial bandwidth part.

In some implementations, the specific case may mean that the reduced capability terminal needs to initiate random access, and there is no RO on a bandwidth part activated by the terminal. In this case, a low-capacity terminal needs to switch to the target initial bandwidth part to perform random access. The applying rule for the target initial bandwidth part may be configuring the target initial bandwidth part applied by the reduced capability terminal with one receiving antenna as the initial BWP 1, and the target initial bandwidth part applied by the reduced capability terminal with two receiving antennas as the initial BWP 2. Therefore, the reduced capability terminal determines the target initial bandwidth part applied in the foregoing case according to the applying rule for the target initial bandwidth part.

It should be noted that in the foregoing implementations, the terminal capability of the reduced capability terminal may further include other cases, such as a frequency division duplexing mode supported by the reduced capability terminal, whether the reduced capability terminal supports PEI, whether a first measurement value measured by the reduced capability terminal is equal to or greater than a first threshold, and the like. Therefore, the reduced capability terminal determines the target initial bandwidth part in the foregoing specific case (or applied to the specific case) according to the first information. This is not repeated in embodiments of this application.

In addition, the first information may also only include one of the applying rule for the target initial bandwidth part or the first configuration information. The reduced capability terminal may determine the target initial bandwidth part applied in the foregoing specific case based on one of the applying rule for the target initial bandwidth part or the first configuration information. For example, after releasing the RRC connection and entering the RRC inactive mode or the idle mode, the reduced capability terminal with one receiving antenna may be determining the initial BWP 1 as the target initial bandwidth part, and the reduced capability terminal with two receiving antennas may be determining the initial BWP 2 as the target initial bandwidth part. The specific case may be further in other manners. This is not listed herein.

Optionally, it is assumed that the second initial bandwidth part is an initial bandwidth part configured for the non-reduced capability terminal. When the reduced capability terminal cannot apply the second initial bandwidth part, for example, the bandwidth of the second initial bandwidth part is greater than 20 MHz, a quantity of first initial bandwidth parts configured for the reduced capability terminal by the network side device is at least two. The reduced capability terminal may determine the target initial bandwidth part that is applied in at least two first initial bandwidth parts according to a terminal capability of the reduced capability terminal or the first configuration information.

Optionally, after step 202, to be specific, after the terminal determines the target initial bandwidth part, the method further includes:

under a specific condition, switching to the target initial bandwidth part, where the first specific condition includes at least one of the following:

an active bandwidth part is not the target initial bandwidth part;

the terminal releases an RRC connection;

the terminal enters an RRC inactive mode or an idle mode;

a bandwidth part inactivity timer expires, and the terminal is not configured with a default bandwidth part;

the bandwidth part inactivity timer expires, and the default bandwidth part configured by the terminal is an initial bandwidth part; and the terminal needs to initiate random access, and there is no RO on the active bandwidth part.

In embodiments of this application, after the terminal determines the target initial bandwidth part in the first initial bandwidth part and/or the second initial bandwidth part according to the first information, if the foregoing specific condition is met, the terminal switches to the target initial bandwidth part.

For example, in some embodiments, after the terminal determines the target initial bandwidth part, if the current active bandwidth part of the terminal is not the target initial bandwidth part, the terminal switches to the target initial bandwidth part.

In some other embodiments, for example, when the terminal releases the RRC connection, the terminal may switch to the determined target initial bandwidth part. Alternatively, when the terminal enters the RRC inactive mode or the idle mode, the terminal switches to the target initial bandwidth part.

In some other embodiments, for example, when the bandwidth part inactivity timer expires (bwp-inactivity-timer), and the default bandwidth part is not configured by the terminal, the terminal switches to the determined target initial bandwidth part; or the bandwidth part inactivity timer expires (bwp-inactivitytimer), and the default bandwidth part configured by the terminal is an initial bandwidth part, the terminal switches to the target initial bandwidth part. In addition, when the terminal needs to initiate random access, and there is no RO on the current active bandwidth part of the terminal, the terminal switches to the target initial bandwidth part.

In this way, when the terminal determines the target initial bandwidth part, and the terminal is under the specific condition, the terminal may switch to the target initial bandwidth part, to ensure communication performance.

The initial bandwidth part mentioned in embodiments of this application includes at least one of an initial uplink bandwidth part and an initial downlink bandwidth part. For example, the first initial bandwidth part includes a first initial uplink (UL) bandwidth part and a first initial downlink (DL) bandwidth part.

It should be noted that in the terminal in embodiments of this application, for example, using a reduced capability terminal as an example, under a frequency division duplexing (FDD) system, the initial uplink bandwidth part (initial UL BWP) and the initial downlink bandwidth part (initial DL BWP) applied by the reduced capability terminal may not be used in pairs. For example, the reduced capability terminal may activate an initial UL BWP 1 and an initial DL BWP 2. In a system in which a duplex mode is time division duplexing (TDD), the initial uplink bandwidth part and the initial downlink bandwidth part that are applied by the reduced capability terminal need to be used in pairs. For example, if the reduced capability terminal currently uses the initial UL BWP 1, the initial downlink bandwidth part needs to use the initial DL BWP 1, and a center frequency of the initial uplink bandwidth part keeps consistent with a center frequency the initial downlink bandwidth part.

In the technical solution provided in embodiments of this application, the terminal determines the target initial bandwidth part applied by the terminal in the first initial bandwidth part and/or the second initial bandwidth part according to the first configuration information and/or the applying rule for the target initial bandwidth part. In this way, each terminal may determine its own target initial bandwidth part based on the first information, thereby avoiding network congestion caused by a large quantity of terminals applying the same initial bandwidth part, and ensuring communication performance.

Figure 3:
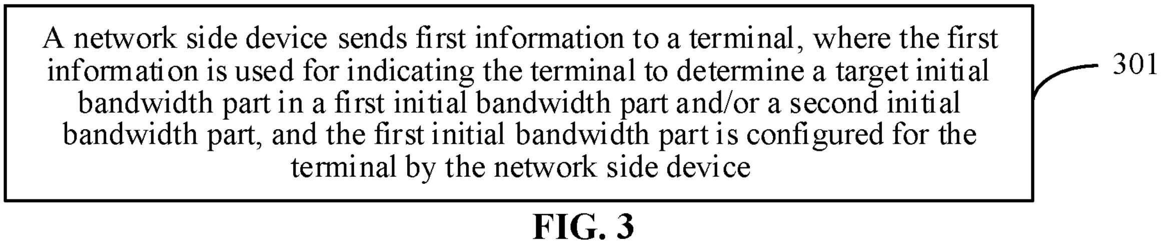
FIG. 3 is a flowchart of an initial bandwidth part determining method according to another embodiment of this application.

FIG. 3 is a flowchart of another initial bandwidth part determining method according to an embodiment of this application. The method is applied to a network side device. As shown in FIG. 3, the method includes the following steps:

Step 301: Send, by a network side device, first information to a terminal, where the first information is used for indicating the terminal to determine a target initial bandwidth part in a first initial bandwidth part and/or a second initial bandwidth part, and the first initial bandwidth part is configured for the terminal by the network side device.

the first information includes at least one of the following:

first configuration information, where the first configuration information is used for configuring the target initial bandwidth part applied by the terminal; and an applying rule for the target initial bandwidth part.

In embodiments of this application, the network side device may send the first information to the terminal, and the first information is used for indicating the terminal to determine the target initial bandwidth part in the first initial bandwidth part and/or the second initial bandwidth part, thereby enabling each terminal to determine its own target initial bandwidth part based on the first information, to avoid network congestion caused by a large quantity of terminals applying the same initial bandwidth part, and ensure communication performance.

The terminal determines a specific implementation of the target initial bandwidth part according to the first configuration information and/or the applying rule for the target initial bandwidth part. Refer to the detailed description in the method embodiment described in FIG. 2. This is not described herein again.

Optionally, the first information is used for indicating the terminal to determine the target initial bandwidth part in the first initial bandwidth part when a bandwidth of the second initial bandwidth part is greater than a preset value.

Optionally, the first information is used for indicating the terminal to determine the target initial bandwidth part applied to a specific case in the first initial bandwidth part and/or the second initial bandwidth part, where the specific case includes at least one of the following:

the terminal performs initial access;

after a radio resource control RRC connection is released, the terminal is in an RRC inactive mode or an idle mode;

a bandwidth part inactivity timer expires, and the terminal is not configured with a default bandwidth part;

the bandwidth part inactivity timer expires, and the default bandwidth part configured by the terminal is an initial bandwidth part; and the terminal needs to initiate random access, and there is no random access channel occasion RO on an active bandwidth part.

Optionally, when the first information includes the applying rule for the target initial bandwidth part, the first information is used for indicating at least one of the following:

determining, by the terminal, the target initial bandwidth part based on a terminal capability of the terminal, where determined target initial bandwidth parts are different when different terminal capability is; and determining, by the terminal, the target initial bandwidth part based on a terminal identifier of the terminal.

Optionally, the terminal capability includes at least one of the following:

a quantity of receiving antennas;

a supported frequency division duplexing mode, where the duplex mode includes any one of a full duplex mode, a mixed duplex mode, and a half duplex mode;

whether a measured first measurement value is equal to or greater than a first threshold;

whether a paging early indication PEI is supported; and whether a small data transmission SDT function in an RRC idle mode or an inactive mode is supported.

Optionally, the first information is used for indicating the terminal to perform a modulo N operation based on the terminal identifier of the terminal, to obtain a remainder value, and determining the target initial bandwidth part according to the remainder value, where N is a total quantity of initial bandwidth parts that the terminal is capable of applying.

An execution entity of the method provided in embodiments of this application is the network side device and corresponds to the initial bandwidth part determining method executed by the terminal side in FIG. 2. A specific implementation process of the method described in embodiments of this application may refer to the detailed description of the method embodiment in FIG. 2. To avoid repetition, this is not repeated herein.

In embodiments of this application, the network side device may send the first information to the terminal, and the terminal may determine the target initial bandwidth part according to the first information. In this way, each terminal may determine its own target initial bandwidth part based on the first information, thereby avoiding network congestion caused by a large quantity of terminals applying the same initial bandwidth part, and ensuring communication performance.

It is to be noted that an execution entity of the initial bandwidth part determining method provided in embodiments of this application may be an initial bandwidth part determining apparatus, or a control module in the initial bandwidth part determining apparatus configured to execute the initial bandwidth part determining method. In embodiments of this application, an example in which the initial bandwidth part determining apparatus performs the initial bandwidth part determining method is used, to describe the initial bandwidth part determining apparatus provided in embodiments of this application.

Figure 4:
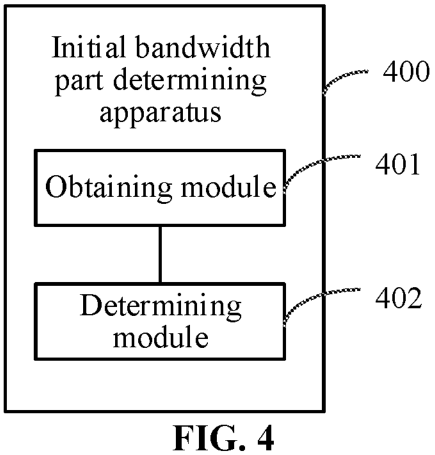
FIG. 4 is a structural diagram of an initial bandwidth part determining apparatus according to an embodiment of this application.

FIG. 4 is a structural diagram of an initial bandwidth part determining apparatus according to an embodiment of this application. As shown in FIG. 4, the initial bandwidth part determining apparatus 400 includes:

an obtaining module 401, configured to obtain first information; and a determining module 402, configured to determine a target initial bandwidth part among a first initial bandwidth part and/or a second initial bandwidth part according to the first information, where the first initial bandwidth part is configured for the apparatus by a network side device; and the first information includes at least one of the following:

first configuration information, where the first configuration information is used for configuring the target initial bandwidth part applied by the apparatus; and an applying rule for the target initial bandwidth part.

Optionally, the determining module 402 is further configured to:

determine the target initial bandwidth part in the first initial bandwidth part according to the first information when a bandwidth of the second initial bandwidth part is greater than a preset value.

Optionally, the determining module 402 is further configured to:

determine, according to the first information, the target initial bandwidth part applied to a specific case in the first initial bandwidth part and/or the second initial bandwidth part, where the specific case includes at least one of the following:

the apparatus performs initial access;

after a radio resource control RRC connection is released, the apparatus is in an RRC inactive mode or an idle mode;

a bandwidth part inactivity timer expires, and the apparatus is not configured with a default bandwidth part;

the bandwidth part inactivity timer expires, and the default bandwidth part configured by the apparatus is an initial bandwidth part; and the apparatus needs to initiate random access, and there is no random access channel occasion RO on an active bandwidth part.

Optionally, the apparatus further includes a switching module, and the switching module is configured to:

under a specific condition, switch to the target initial bandwidth part, where the first specific condition includes at least one of the following:

an active bandwidth part is not the target initial bandwidth part;

the apparatus releases an RRC connection;

the apparatus enters an RRC inactive mode or an idle mode;

a bandwidth part inactivity timer expires, and the apparatus is not configured with a default bandwidth part;

the bandwidth part inactivity timer expires, and the default bandwidth part configured by the apparatus is an initial bandwidth part; and the apparatus needs to initiate random access, and there is no RO on the active bandwidth part.

Optionally, when the first information includes the applying rule for the target initial bandwidth part, the determining module 402 is further configured to perform at least one of the following:

determining the target initial bandwidth part based on a terminal capability of the terminal, where determined target initial bandwidth parts are different when different terminal capability is; and determining the target initial bandwidth part based on a terminal identifier of the terminal.

Optionally, the terminal capability includes at least one of the following:

a quantity of receiving antennas;

a supported frequency division duplexing mode, where the duplex mode includes any one of a full duplex mode, a mixed duplex mode, and a half duplex mode;

whether a measured first measurement value is equal to or greater than a first threshold;

whether a paging early indication PEI is supported; and whether a small data transmission SDT function in an RRC idle mode or an inactive mode is supported.

Optionally, the determining module 402 is further configured to: perform a modulo N operation based on the terminal identifier of the determining module 402, to obtain a remainder value, and determine the target initial bandwidth part according to the remainder value, where N is a total quantity of initial bandwidth parts that the apparatus is capable of applying.

In embodiments of this application, the apparatus determines the applied target initial bandwidth part in the first initial bandwidth part and/or the second initial bandwidth part according to the obtained first information. In this way, each apparatus may determine a target initial bandwidth part of each apparatus based on the first information, thereby avoiding network congestion caused by a large quantity of apparatuses applying the same initial bandwidth part, and ensuring communication performance.

The initial bandwidth part determining apparatus 400 in embodiments of this application may be an apparatus, an apparatus or an electronic device with an operating system, or may be a component, an integrated circuit, or a chip in a terminal. The apparatus or electronic device may be a mobile terminal, or may be a non-mobile terminal. For example, the mobile terminal may include, but is not limited to, Type of the terminal 11 listed above, and a non-mobile terminal may be a server, a network attached storage (NAS), a personal computer (PC), a television (TV), a cash machine, a self-service machine, or the like, which is not specifically limited in embodiments of this application.

The initial bandwidth part determining apparatus 400 provided in embodiments of this application may implement various processes implemented by the terminal in the method embodiment in FIG. 2, and implement the same technical effect. This is not repeated herein to avoid repetition.

Figure 5:
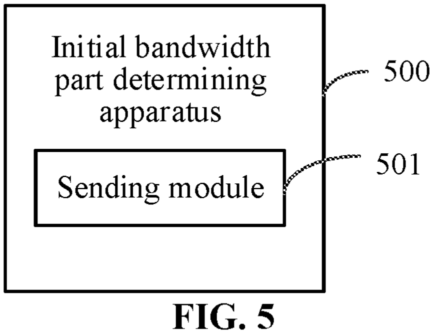
FIG. 5 is a structural diagram of an initial bandwidth part determining apparatus according to another embodiment of this application.

FIG. 5 is a structural diagram of another initial bandwidth part determining apparatus according to an embodiment of this application. As shown in FIG. 5, the initial bandwidth part determining apparatus 500 includes:

a sending module 501, configured to send first information to a terminal, where the first information is used for indicating the terminal to determine a target initial bandwidth part in a first initial bandwidth part and/or a second initial bandwidth part, and the first initial bandwidth part is configured for the terminal by the apparatus; and the first information includes at least one of the following:

first configuration information, where the first configuration information is used for configuring the target initial bandwidth part applied by the terminal; and an applying rule for the target initial bandwidth part.

Optionally, the first information is used for indicating the terminal to determine the target initial bandwidth part in the first initial bandwidth part when a bandwidth of the second initial bandwidth part is greater than a preset value.

Optionally, the first information is used for indicating the terminal to determine the target initial bandwidth part applied to a specific case in the first initial bandwidth part and/or the second initial bandwidth part, where the specific case includes at least one of the following:

the terminal performs initial access;

after the terminal releases a radio resource control RRC connection, a bandwidth part inactivity timer expires, and the terminal is not configured with a default bandwidth part;

the bandwidth part inactivity timer expires, and the default bandwidth part configured by the terminal is an initial bandwidth part; and the terminal needs to initiate random access, and there is no random access channel occasion RO on an active bandwidth part.

Optionally, when the first information includes the applying rule for the target initial bandwidth part, the first information is used for indicating at least one of the following:

determining, by the terminal, the target initial bandwidth part based on a terminal capability of the terminal, where determined target initial bandwidth parts are different when different terminal capability is; and determining, by the terminal, the target initial bandwidth part based on a terminal identifier of the terminal.

Optionally, the terminal capability includes at least one of the following:

a quantity of receiving antennas;

a supported frequency division duplexing mode, where the duplex mode includes any one of a full duplex mode, a mixed duplex mode, and a half duplex mode;

whether a measured first measurement value is equal to or greater than a first threshold;

whether a paging early indication PEI is supported; and whether a small data transmission SDT function in an RRC idle mode or an inactive mode is supported.

Optionally, the first information is used for indicating the terminal to perform a modulo N operation based on the terminal identifier of the terminal, to obtain a remainder value, and determining the target initial bandwidth part according to the remainder value, where N is a total quantity of initial bandwidth parts that the terminal is capable of applying.

In embodiments of this application, the apparatus may send the first information to the terminal, and the first information is used for indicating the terminal to determine the target initial bandwidth part in the first initial bandwidth part and/or the second initial bandwidth part, thereby avoiding network congestion caused by a large quantity of terminals applying the same initial bandwidth part, and ensuring communication performance.

The initial bandwidth part determining apparatus 500 provided in embodiments of this application may implement various processes implemented by the network side device in the method embodiment in FIG. 3, and implement the same technical effect. This is not repeated herein to avoid repetition.

Figure 6:
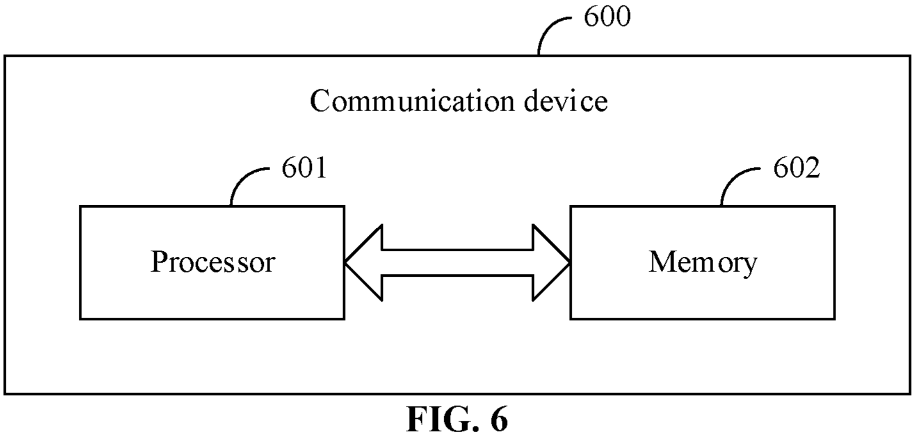
FIG. 6 is a structural diagram of a communication device according to an embodiment of this application.

Optionally, as shown in FIG. 6, embodiments of this application further provide a communication device 600, including a processor 601, a memory 602, and a program or an instruction stored in the memory 602 and executable on the processor 601. For example, when the communication device 600 is a terminal, the program or instruction is executed by the processor 601 to implement various processes of the method embodiment in FIG. 2, and may implement the same technical effect. When the communication device 600 is a network side device, each process of the foregoing method embodiment in FIG. 3 is implemented when the program or instruction are executed by the processor 601, and a same technical effect may be achieved. This is not repeated herein to avoid repetition.

Figure 7:
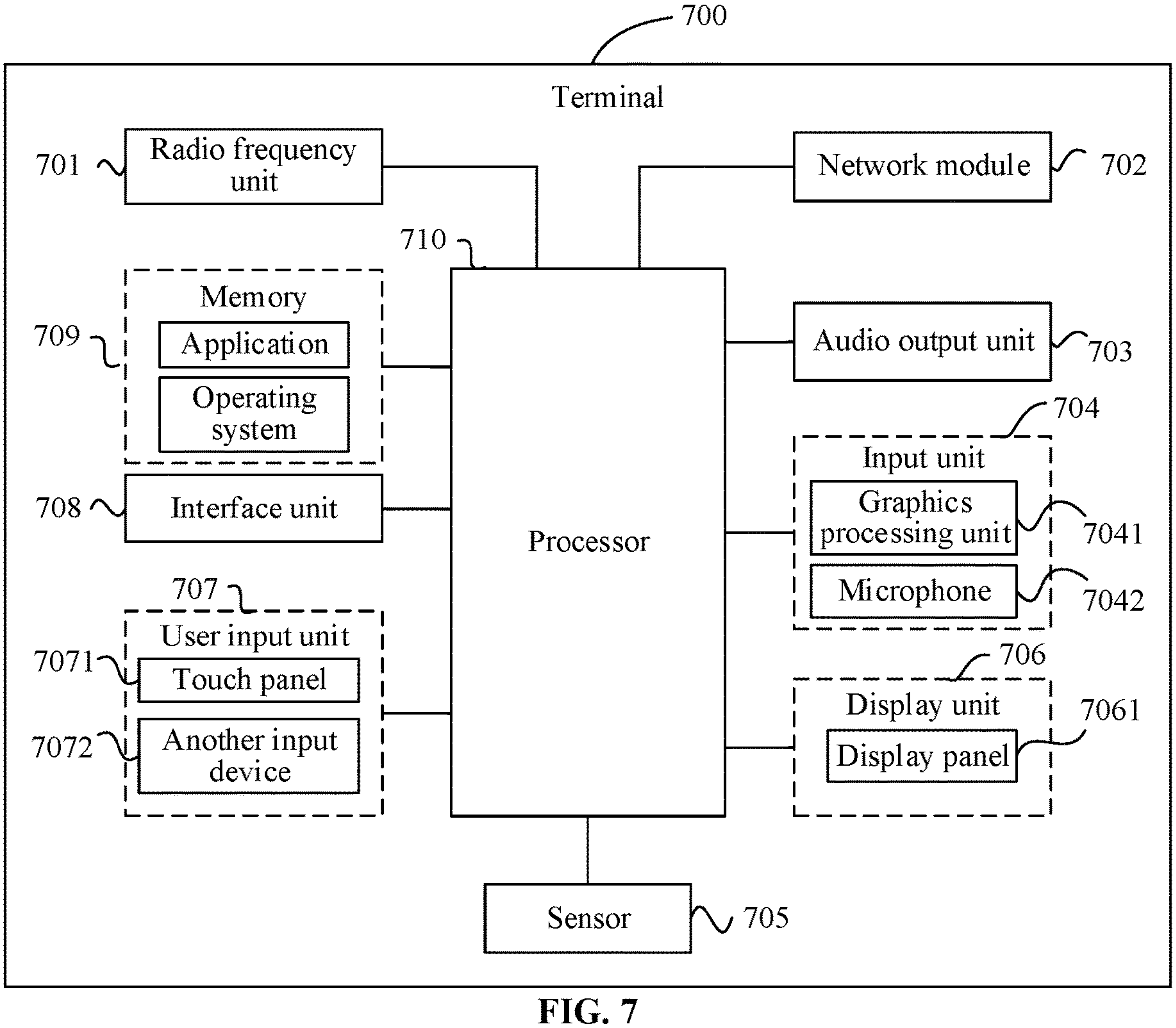
FIG. 7 is a structural diagram of a terminal according to an embodiment of this application.

Embodiments of this application further provide a terminal, including a processor and a communication interface. The communication interface is configured to obtain first information. The processor is configured to determine a target initial bandwidth part among a first initial bandwidth part and/or a second initial bandwidth part according to the first information. This terminal embodiment corresponds to the terminal-side method embodiment. Each implementation process and implementation of the method embodiment may be applied to the terminal embodiment, and may achieve the same technical effect. This is not repeated subsequently. Specifically, FIG. 7 is a schematic diagram of a hardware structure of a terminal according to an embodiment of this application.

The terminal 700 includes, but is not limited to, at least a part of components such as a radio frequency unit 701, a network module 702, an audio output unit 703, an input unit 704, a sensor 705, a display unit 706, a user input unit 707, an interface unit 708, a memory 709, and a processor 710.

A person skilled in the art may understand that the terminal 700 may further include the power supply (such as a battery) for supplying power to the components. The power supply may be logically connected to the processor 710 by a power management system, thereby implementing functions such as charging, discharging, and power consumption management by using the power management system. A terminal structure shown in FIG. 7 does not constitute a limitation to the terminal, and the terminal may include more or fewer components than those shown in the figure, or some components may be combined, or a different component deployment may be used, and details are not repeated herein.

It should be understood that, in embodiments of this application, the input unit 704 may include a graphics processing unit (GPU) 7041 and a microphone 7042. The graphics processing unit 7041 performs processing on image data of a static picture or a video that is obtained by an image acquisition apparatus (for example, a camera) in a video acquisition mode or an image acquisition mode. The display unit 706 may include a display panel 7061, and the display panel 7061 may be configured by using a liquid crystal display, an organic light-emitting diode, or the like. The user input unit 707 includes a touch panel 7071 and another input device 7072. The touch panel 7071 is also referred to as a touchscreen. The touch panel 7071 may include two parts: a touch detection apparatus and a touch controller. The another input device 7072 may include, but not limited to, a physical keyboard, a functional key (such as a volume control key or a switch key), a track ball, a mouse, and a joystick, which are not described herein in detail.

In embodiments of this application, the radio frequency unit 701 receives downlink data from a network side device and transmits the downlink data to the processor 710 for processing; and transmits uplink data to the network side device. Generally, the radio frequency unit 701 includes, but is not limited to, an antenna, at least one amplifier, a transceiver, a coupler, a low noise amplifier, a duplexer, and the like.

The memory 709 may be configured to store a software program or an instruction and various data. The memory 709 may mainly include a program or an instruction storage area and a data storage area. The program or instruction storage area may store an operating system, an application program or instruction required by at least one function (such as a sound playback function and an image display function), and the like. In addition, the memory 709 may include a high-speed random access memory, and may further include a non-volatile memory, where the non-volatile memory may be a read-only memory (ROM), a programmable ROM (PROM), an erasable PROM (EPROM), an electrically EPROM (EEPROM), or a flash memory. Such as at least one magnetic disk storage device, a flash storage device, or other non-volatile solid-state storage devices.

The processor 710 may include one or more processing units. Optionally, the processor 710 may integrate an application processor and a modem, where the application processor mainly processes an operating system, a user interface, and an application program or instruction, and the modem mainly processes wireless communication, such as a baseband processor. It may be understood that the foregoing modem may either not be integrated into the processor 710.

The radio frequency unit 701 is configured to obtain first information; and the processor 710 is configured to determine a target initial bandwidth part among a first initial bandwidth part and/or a second initial bandwidth part according to the first information, where the first initial bandwidth part is configured for the terminal 700 by a network side device; and the first information includes at least one of the following:

first configuration information, where the first configuration information is used for configuring the target initial bandwidth part applied by the terminal 700; and an applying rule for the target initial bandwidth part.

Optionally, the processor 710 is further configured to: determine the target initial bandwidth part in the first initial bandwidth part according to the first information when a bandwidth of the second initial bandwidth part is greater than a preset value.

Optionally, the processor 710 is further configured to: determine, according to the first information, the target initial bandwidth part applied to a specific case in the first initial bandwidth part and/or the second initial bandwidth part, where the specific case includes at least one of the following:

the terminal 700 performs initial access;

after a radio resource control RRC connection is released, the terminal 700 is in an RRC inactive mode or an idle mode;

a bandwidth part inactivity timer expires, and the terminal 700 is not configured with a default bandwidth part;

the bandwidth part inactivity timer expires, and the default bandwidth part configured by the terminal 700 is an initial bandwidth part; and the terminal 700 needs to initiate random access, and there is no random access channel occasion RO on an active bandwidth part.

Optionally, the processor 710 is further configured to:

under a specific condition, switch to the target initial bandwidth part, where the first specific condition includes at least one of the following:

an active bandwidth part is not the target initial bandwidth part;

the terminal 700 releases an RRC connection;

the terminal 700 enters an RRC inactive mode or an idle mode;

a bandwidth part inactivity timer expires, and the terminal 700 is not configured with a default bandwidth part;

the bandwidth part inactivity timer expires, and the default bandwidth part configured by the terminal 700 is an initial bandwidth part; and the terminal 700 needs to initiate random access, and there is no RO on the active bandwidth part.

Optionally, when the first information includes the applying rule for the target initial bandwidth part, the processor 710 is further configured to perform at least one of the following:

determining the target initial bandwidth part based on a terminal capability of the terminal, where determined target initial bandwidth parts are different when different terminal capability is; and determining the target initial bandwidth part based on a terminal identifier of the terminal.

Optionally, the terminal capability includes at least one of the following:

a quantity of receiving antennas;

a supported frequency division duplexing mode, where the duplex mode includes any one of a full duplex mode, a mixed duplex mode, and a half duplex mode;

whether a measured first measurement value is equal to or greater than a first threshold;

whether a paging early indication PEI is supported; and whether a small data transmission SDT function in an RRC idle mode or an inactive mode is supported.

Optionally, the processor 710 is further configured to:

perform a modulo N operation based on the terminal identifier of the processor 710, to obtain a remainder value, and determine the target initial bandwidth part according to the remainder value, where N is a total quantity of initial bandwidth parts that the terminal is capable of applying.

In embodiments of this application, the terminal 700 determines the target initial bandwidth part applied by the terminal 700 in the first initial bandwidth part and/or the second initial bandwidth part according to the first configuration information and/or the applying rule for the target initial bandwidth part. In this way, each terminal may determine its own target initial bandwidth part based on the first information, thereby avoiding network congestion caused by a large quantity of terminals applying the same initial bandwidth part, and ensuring communication performance.

Embodiments of this application further provide a network side device, including a processor and a communication interface. The communication interface is configured to send first information to a terminal, where the first information is used for indicating the terminal to determine a target initial bandwidth part in a first initial bandwidth part and/or a second initial bandwidth part, and the first initial bandwidth part is configured for the terminal by the network side device; and the first information includes at least one of the following: first configuration information, where the first configuration information is used for configuring the target initial bandwidth part applied by the terminal; and an applying rule for the target initial bandwidth part. The network side device embodiment corresponds to the network side device method embodiment. Each implementation process and implementation of the method embodiment may be applied to the network side device embodiment, and may achieve the same technical effect.

Figure 8:
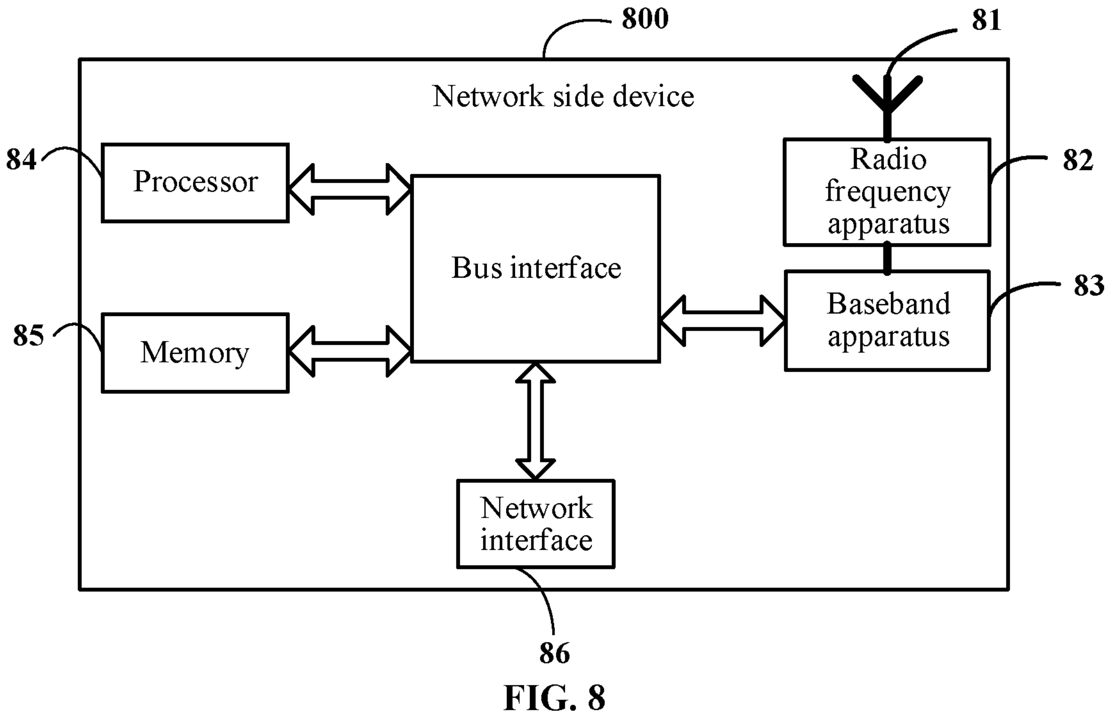
FIG. 8 is a structural diagram of a network side device according to an embodiment of this application.

Specifically, embodiments of this application further provide a network side device. As shown in FIG. 8, the network side device 800 includes: an antenna 81, a radio frequency apparatus 82, and a baseband apparatus 83. The antenna 81 is connected to the radio frequency apparatus 82. In an uplink direction, the radio frequency apparatus 82 receives information through the antenna 81, and transmits the received information to the baseband apparatus 83 for processing. In a downlink direction, the baseband apparatus 83 performs processing on the to-be-transmitted information, and transmits the to-be-transmitted information to the radio frequency apparatus 82. After performing processing on the received information, the radio frequency apparatus 82 transmits the received information out through the antenna 81.

The frequency band processing apparatus may be located in the baseband apparatus 83, and the method performed by the network side device in the foregoing embodiment may be implemented in the baseband apparatus 83. The baseband apparatus 83 includes a processor 84 and a memory 85.

The baseband apparatus 83 may include, for example, at least one baseband board, and a plurality of chips are arranged on the baseband board. As shown in FIG. 8, for example, one of the chips is a processor 84, and is connected with the memory 85, to invoke a program in the memory 85, and to perform the network device operation shown in the foregoing method embodiments.

The baseband apparatus 83 may further include a network interface 86 used for exchanging information with the radio frequency apparatus 82. For example, the interface is a common public radio interface (CPRI).

Specifically, the network side device 800 in embodiments of the present invention further includes: an instruction or a program stored in the memory 85 and executable on the processor 84. The processor 84 invokes the instruction or program in the memory 85 to perform the method performed by each module shown in FIG. 5, and implements the same technical effect. This is not repeated herein to avoid repetition.

Embodiments of this application further provide a readable storage medium, storing therein a program or an instruction, where the program or instruction, when executed by a processor, implements various processes of the method embodiment in FIG. 2 or various processes of the method embodiment in FIG. 3, and may implement the same technical effects. This is not repeated herein to avoid repetition.

The processor is a processor in the terminal described in the foregoing embodiment. The readable storage medium includes a computer-readable storage medium, for example, a Read-Only Memory (ROM), a Random Access Memory (RAM), a magnetic disk, an optical disc or the like.

Embodiments of this application further provide a chip, including a processor and a communication interface, where the communication interface is coupled to the processor. The processor is configured to run a program or an instruction, to implement various processes of the method embodiment in FIG. 2, or various processes of the method embodiment in FIG. 3, and may implement the same technical effects. This is not repeated herein to avoid repetition.

It should be understood that the chip mentioned in embodiments of this application may further be referred to as a system-level chip, a system chip, a chip system, a system on chip, or the like.

It is to be noted that the terms "include", "comprise", or any other variation thereof in this specification intends to cover a non-exclusive inclusion, which specifies the presence of stated processes, methods, objects, or apparatuses, but do not preclude the presence or addition of one or more other processes, methods, objects, or apparatuses. Without more limitations, elements defined by the sentence "including one" does not exclude that there are still other same elements in the processes, methods, objects, or apparatuses. In addition, it should be noted that the scope of the methods and apparatuses in the implementations of this application is not limited to performing functions in the order shown or discussed, and may further include performing functions in a substantially simultaneous manner or in a reverse order according to the functions involved, for example, the described methods may be performed in an order different from the order described, and various steps may be added, omitted, or combined. In addition, features described with reference to some examples may be combined in other examples.

Through the foregoing description on the implementations, a person skilled in the art can clearly learn that the foregoing embodiment methods may be implemented by using software in combination with a necessary universal hardware platform. Certainly, the embodiment methods may also be implemented by using hardware, but the former is a better implementation in many cases. Based on such an understanding, the technical solutions of this application essentially, or the part contributing to the related art, may be presented in the form of a computer software product. The computer software product is stored in a storage medium (for example, a ROM/RAM, a magnetic disk, or an optical disc) including several instructions to enable a terminal (which may be a mobile phone, a computer, a server, an air conditioner, a network device, or the like) to perform the methods described in embodiments of this application.

Although embodiments of this application have been described above with reference to the accompanying drawings, this application is not limited to the specific implementations described above, and the specific implementations described above are merely exemplary and not limitative. A person of ordinary skill in the art may make various variations under the teaching of this application without departing from the spirit of this application and the protection scope of the claims, and such variations shall all fall within the protection scope of this application.

What is claimed is:

1. An initial bandwidth part determining method, comprising:

obtaining, by a terminal, first information; and determining, by the terminal, a target initial bandwidth part among a first initial bandwidth part and a second initial bandwidth part according to the first information wherein the first information comprises at least one of the following: first configuration information, wherein the first configuration information is used for configuring the target initial bandwidth part applied by the terminal, and the first initial bandwidth part is the initial bandwidth part configured for a reduced capability terminal by a network side device, the second initial bandwidth part is the initial bandwidth part configured for a non-reduced capability terminal by the network side device, wherein terminals with different terminal capabilities support applying different target initial bandwidth parts.

2. The method according to claim 1, further comprising:

under a specific condition, switching to the target initial bandwidth part, wherein the first specific condition comprises at least one of the following:

the bandwidth part inactivity timer expires;

there is no RO on the active bandwidth part.

3. The method according to claim 1, wherein after the determining, by the terminal, a target initial bandwidth part among a first initial bandwidth part and/or a second initial bandwidth part according to the first information, the method further comprises:

under a specific condition, switching to the target initial bandwidth part, wherein the first specific condition comprises at least one of the following:

an active bandwidth part is not the target initial bandwidth part;

the terminal releases an RRC connection;

the terminal enters an RRC inactive mode or an idle mode;

a bandwidth part inactivity timer expires, and the terminal is not configured with a default bandwidth part;

the bandwidth part inactivity timer expires, and the default bandwidth part configured by the terminal is an initial bandwidth part; and the terminal needs to initiate random access, and there is no RO on the active bandwidth part.

4. The method according to claim 1, wherein when the first information comprises the applying rule for the target initial bandwidth part, the determining, by terminal, the target initial bandwidth part among the first initial bandwidth part and/or the second initial bandwidth part according to the applying rule for the target initial bandwidth part comprises at least one of the following:

determining, by the terminal, the target initial bandwidth part based on a terminal capability of the terminal, wherein determined target initial bandwidth parts are different when different terminal capability is; and determining, by the terminal, the target initial bandwidth part based on a terminal identifier of the terminal.

5. The method according to claim 4, wherein the terminal capability comprises at least one of the following:

a quantity of receiving antennas;

a supported frequency division duplexing mode, wherein the duplex mode comprises any one of a full duplex mode, a mixed duplex mode, and a half duplex mode;

whether a measured first measurement value is equal to or greater than a first threshold;

whether a paging early indication PEI is supported; and whether a small data transmission SDT function in an RRC idle mode or an inactive mode is supported.

6. The method according to claim 4, wherein the determining, by the terminal, the target initial bandwidth part based on a terminal identifier of the terminal comprises:

performing, by the terminal, a modulo N operation based on the terminal identifier of the terminal, to obtain a remainder value, and determining the target initial bandwidth part according to the remainder value, wherein N is a total quantity of initial bandwidth parts that the terminal is capable of applying.

7. The method according to claim 1, wherein the first initial bandwidth part comprises a first initial uplink (UL) bandwidth part and a first initial downlink (DL) bandwidth part.

8. An initial bandwidth part determining method, comprising:

sending, by a network side device, first information;

wherein the first information comprises: first configuration information, wherein the first configuration information is used for configuring target initial bandwidth part applied by the terminal, wherein the target initial bandwidth part comprises a first initial bandwidth part and a second initial bandwidth part, and the first initial bandwidth part is the initial bandwidth part configured for a reduced capability terminal by the network side device, the second initial bandwidth part is the initial bandwidth part configured for a non-reduced capability terminal by the network side device, wherein terminals with different terminal capabilities support applying different target initial bandwidth parts.

9. The method according to claim 8, wherein the first initial bandwidth part comprises a first initial uplink (UL) bandwidth part and a first initial downlink (DL) bandwidth part.

10. A terminal, comprising a processor, a memory, and a program or an instruction stored in the memory and executable on the processor, wherein the program or instruction, when executed by the processor, implements:

obtaining, by the terminal, first information; and determining, by the terminal, a target initial bandwidth part among a first initial bandwidth part and a second initial bandwidth part according to the first information wherein the first information comprises: first configuration information, wherein the first configuration information is used for configuring the target initial bandwidth part applied by the terminal, and the first initial bandwidth part is the initial bandwidth part configured for a reduced capability terminal by a network side device, the second initial bandwidth part is the initial bandwidth part configured for a non-reduced capability terminal by the network side device, wherein terminals with different terminal capabilities support applying different target initial bandwidth parts.

11. The terminal according to claim 10, further comprising:

under a specific condition, switching to the target initial bandwidth part, wherein the first specific condition comprises at least one of the following:

the bandwidth part inactivity timer expires;

there is no RO on the active bandwidth part.

12. The terminal according to claim 10, wherein after the determining, by the terminal, a target initial bandwidth part among a first initial bandwidth part and/or a second initial bandwidth part according to the first information, the method further comprises:

under a specific condition, switching to the target initial bandwidth part, wherein the first specific condition comprises at least one of the following:

an active bandwidth part is not the target initial bandwidth part;

the terminal releases an RRC connection;

the terminal enters an RRC inactive mode or an idle mode;

a bandwidth part inactivity timer expires, and the terminal is not configured with a default bandwidth part;

the bandwidth part inactivity timer expires, and the default bandwidth part configured by the terminal is an initial bandwidth part; and the terminal needs to initiate random access, and there is no RO on the active bandwidth part.

13. The terminal according to claim 10, wherein when the first information comprises the applying rule for the target initial bandwidth part, the determining, by terminal, the target initial bandwidth part among the first initial bandwidth part and/or the second initial bandwidth part according to the applying rule for the target initial bandwidth part comprises at least one of the following:

determining, by the terminal, the target initial bandwidth part based on a terminal capability of the terminal, wherein determined target initial bandwidth parts are different when different terminal capability is; and determining, by the terminal, the target initial bandwidth part based on a terminal identifier of the terminal.

14. The terminal according to claim 13, wherein the terminal capability comprises at least one of the following:

a quantity of receiving antennas;

a supported frequency division duplexing mode, wherein the duplex mode comprises any one of a full duplex mode, a mixed duplex mode, and a half duplex mode;

whether a measured first measurement value is equal to or greater than a first threshold;

whether a paging early indication PEI is supported; and whether a small data transmission SDT function in an RRC idle mode or an inactive mode is supported.

15. The terminal according to claim 13, wherein the determining, by the terminal, the target initial bandwidth part based on a terminal identifier of the terminal comprises:

performing, by the terminal, a modulo N operation based on the terminal identifier of the terminal, to obtain a remainder value, and determining the target initial bandwidth part according to the remainder value, wherein N is a total quantity of initial bandwidth parts that the terminal is capable of applying.

16. The terminal according to claim 10, wherein the first initial bandwidth part comprises a first initial uplink (UL) bandwidth part and a first initial downlink (DL) bandwidth part.

17. A network side device, comprising a processor, a memory, and a program or an instruction that are stored in the memory and capable of running on the processor, wherein the program or instruction is executed by the processor to implement the steps of the initial bandwidth part determining method according to claim 8.

* * * * *